No. 608,945. Patented Aug. 9, 1898.
H. B. WILLIAMS.
LIXIVIATION APPARATUS.
(Application filed Jan. 11, 1898.)

(No Model.) 3 Sheets—Sheet 1.

Witnesses. Inventor.
Herbert B. Williams.
By
James L. Norris.
Atty.

No. 608,945. Patented Aug. 9, 1898.
H. B. WILLIAMS.
LIXIVIATION APPARATUS.
(Application filed Jan. 11, 1898.)

(No Model.) 3 Sheets—Sheet 2.

Witnesses.
Robert Everett
F. B. Keefer

Inventor.
Herbert B. Williams,
By James L. Norris
Atty.

No. 608,945. Patented Aug. 9, 1898.
H. B. WILLIAMS.
LIXIVIATION APPARATUS.
(Application filed Jan. 11, 1898.)
(No Model.) 3 Sheets—Sheet 3.
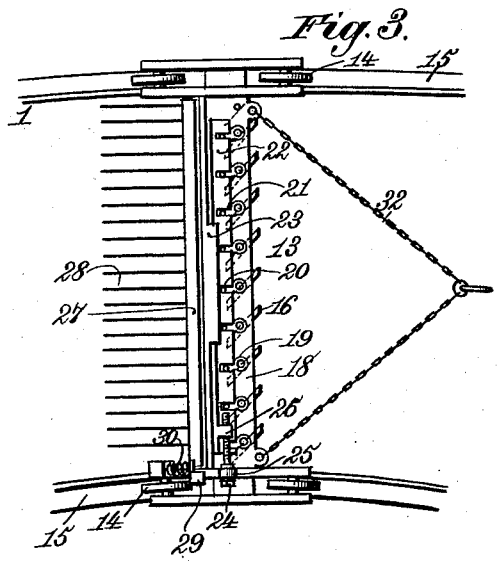
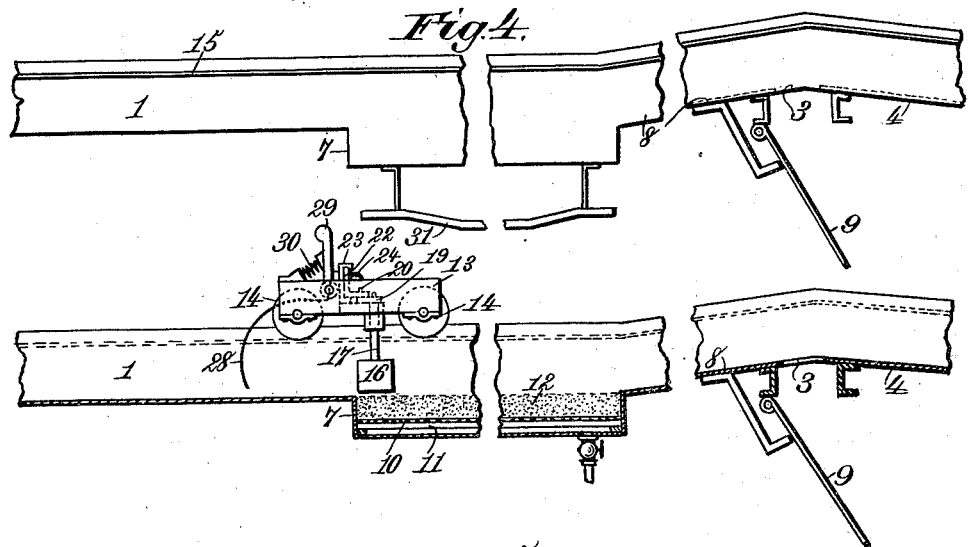
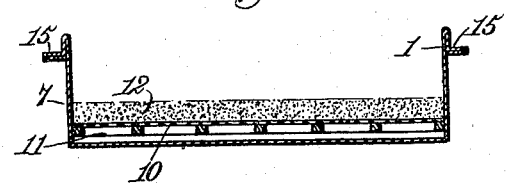
Witnesses. Inventor.
Herbert B. Williams.
By James L. Norris.
Atty.

UNITED STATES PATENT OFFICE.

HERBERT B. WILLIAMS, OF CASTLE GATE, UTAH.

LIXIVIATION APPARATUS.

SPECIFICATION forming part of Letters Patent No. 608,945, dated August 9, 1898.

Application filed January 11, 1898. Serial No. 666,355. (No model.)

*To all whom it may concern:*

Be it known that I, HERBERT B. WILLIAMS, a citizen of the United States, residing at Castle Gate, in the county of Carbon and State of Utah, have invented new and useful Improvements in Lixiviation Apparatus, of which the following is a specification.

It is the object of my invention to provide an efficient and economical lixiviation apparatus designed more especially for the extraction of gold and silver from their ores by the action of a leaching solution, as in the well-known cyanid process.

The apparatus may be operated to advantage under a continuous feed of the ore or other material to be treated and with either a continuous or intermittent feed of the leaching liquid or solution, according to varying conditions of the work required to be done, due provision being also made for controlling the progress of the material through the apparatus, and consequently the length of time during which it is subjected to the leaching operation.

My invention consists in features of construction and novel combinations of parts in a lixiviation apparatus, as hereinafter more particularly described and claimed.

Figure 1:
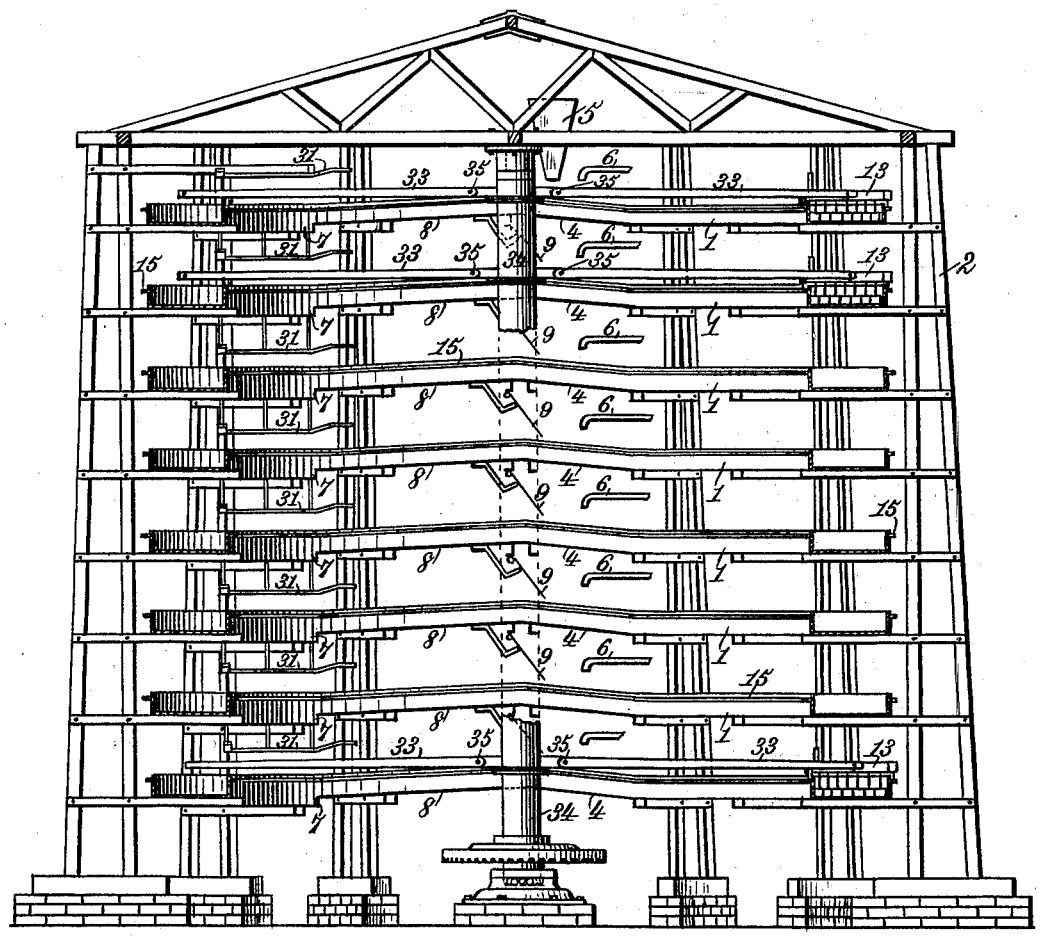
Figure 2:
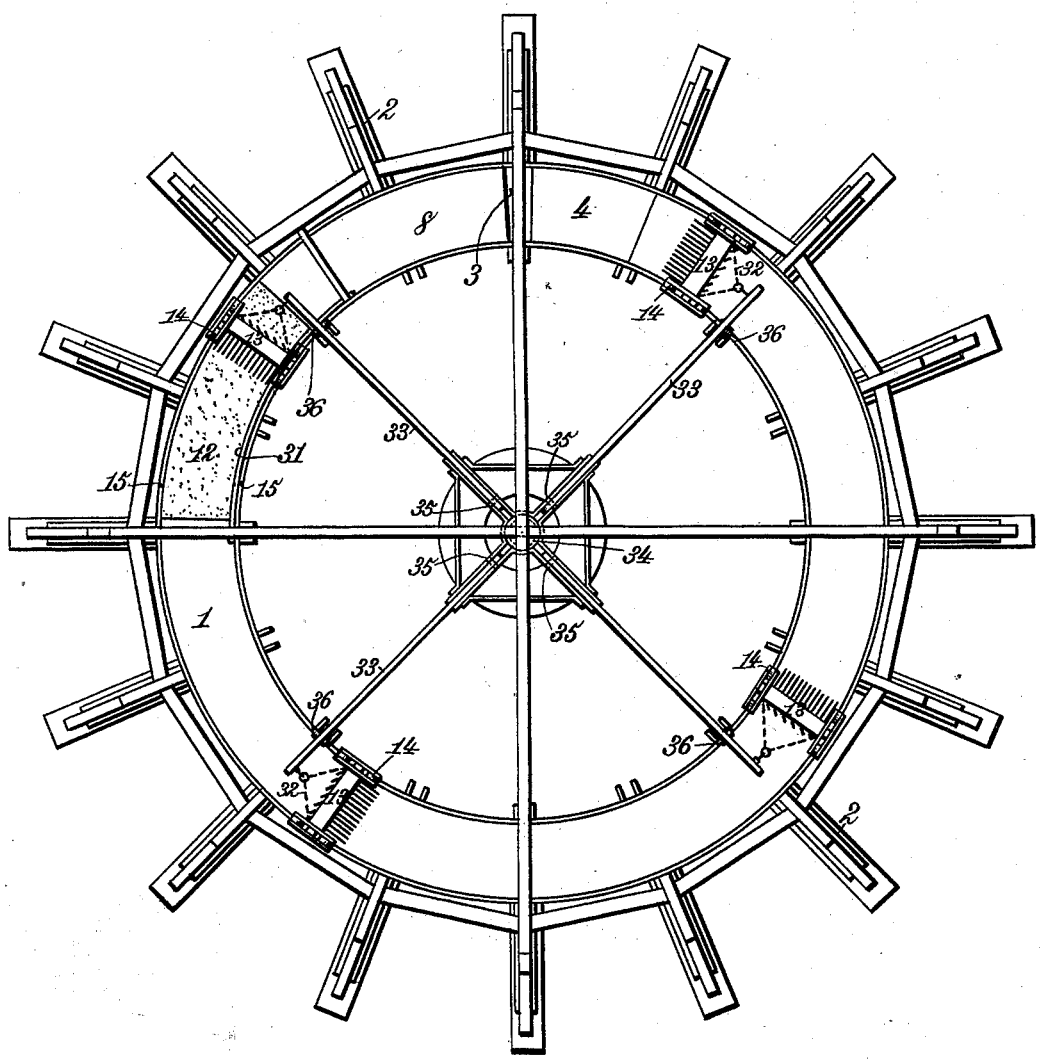

In the annexed drawings, Figure 1 is a part sectional elevation of my improved lixiviation apparatus. Fig. 2 is a plan of the same. Fig. 3 is a plan of a scraper-carriage and a portion of one of the annular leaching-tanks. Fig. 4 is a part sectional view of one of the tank-filters with traveling scraper and rake mechanism. Fig. 5 is a vertical cross-section through the filter portion of a leaching-tank.

This lixiviation apparatus comprises a series of shallow annular or nearly annular tanks 1, arranged one above the other and firmly supported in a framework 2 of suitable form and dimensions. In the bottom of each tank there is an exit-opening 3 about one foot across and having a length equal to the width of the tank. The exit-openings 3 of the several tanks are arranged one above another and in the same vertical plane. On both sides of its exit-opening 3—that is to say, in front and rear thereof—the bottom of the tank is inclined in such directions and to such degree that the bottom of the tank at such opening is about fifteen inches above the level of the main portion of the tank-bottom.

The ore or other material to be treated is fed into the topmost tank of the series onto the incline 4, that leads downward from the tank-exit. For the purpose of delivering the ore to this topmost tank any suitable chute or hopper 5 may be provided, to which the ore can be continuously supplied by means of an automatic feeder and elevator. (Not shown.) A leaching solution is to be supplied separately to each tank through pipes 6, provided for that purpose. The ore is preferably fed to the leaching apparatus continuously and in properly-regulated quantity, while the leaching liquid, such as cyanid solution, is to be supplied continuously or intermittently, according to the requirements of the several tanks.

From the incline 4 of the topmost annular tank the ore and slimes are gradually drawn around through the solution in said tank by means of an automatic scraping and raking mechanism hereinafter described. After being carried around nearly the entire length of the tank the ore is drawn over a filter 7, that is sunk in the tank-bottom, and from thence the ore is drawn up an incline 8 to the tank-exit 3, through which it falls onto an inclined apron 9, that delivers the partly-leached ore or other material onto the descending incline 4 of the next lower annular tank. In like manner the ore is carried around through this second annular tank and thence delivered to the third or next lower tank, and so on throughout the series.

In each annular tank the descending incline 4, on which the ore is received, is about eight feet long and has a drop of about fifteen inches, while the ascending incline 8, that extends from the filter 7 to the tank-exit 3, should preferably have a length of about sixteen feet and a rise of about fifteen inches.

Between its inclines 4 and 8 the floor of each annular tank 1 is level, with the exception of that portion in which the tank-filter 7 is formed, the bottom of said filter being preferably about six inches lower than the main level of the tank-bottom. The filter is extended across the whole width of the tank for a length of about fifteen feet and terminates at the foot of the ascending incline 8, that leads to the tank-exit. As before indicated, this filter is about six inches deeper than the main portion of the annular tank.

Each tank-filter preferably consists of a sheet 10 of canvas, asbestos cloth, or other suitable material mounted on a suitable framework 11, constructed to have a space beneath of about one inch in depth to afford room for drawing off the solution that has passed through the filter. Immediately on top of the filter-cloth 10 there is placed a layer of sand 12 of a medium grade of fineness and about four inches thick, more or less, so that the top of the sand will be on a level with the bottom of the main portion of the tank. This layer of sand will prevent the ore-slimes from clogging the filter-cloth beneath. One of these filters is provided in each annular tank, as shown, and each should be provided with a suitable outlet-pipe for drawing off the solution, as desired.

The automatic mechanism for moving the ore continuously through the several annular tanks and causing it to feed down from one to another comprises a number of carriages 13, mounted on wheels 14, that are arranged to run on track-rails 15, composed of suitable angle-iron secured to the outer sides of the tank. Each carriage 13 affords support for a number of adjustable scrapers 16, attached to the lower ends of vertical arms 17, the upper portions of which are extended loosely through and above a cross-bar 18 of the carriage-frame. To the upper ends of the scraper-arms 17 there are secured crank-arms 19, the rear ends of which are provided with vertical pins 20, engaged in slots 21 of a transversely-arranged slide-bar 22, which is supported in a guide 23, attached to the frame of the carriage. An adjusting-screw 24 is engaged in an internally-threaded lug 25 on the carriage and in a similar lug 26 on the slide-bar 22, so that by a proper manipulation of said screw the slide-bar 22 can be adjusted from side to side of the carriage, and thereby adjust the scrapers 16 to any desired angle with reference to their direction of motion through the tank. By this adjustment of the scrapers 16 their pushing or drawing action on the ore can be controlled, so as to regulate to any desired extent the progress of the ore through the tanks. There is also mounted in the carriage 13 a rocking rake-bar 27, to which a number of downward and rearwardly curved teeth 28 are secured. To one end of the rake-bar 27 there is attached an upward-projecting lever 29, that is normally held in an upright position by means of a spring 30, that is so adjusted and arranged as to hold the teeth 28 off from the bottom of the tank. Over one side of each filter 5 there is suspended a presser-rail 31, which is so placed that the top of the lever 29 will strike it as the scrapers 16 pass over the material on the filter. Thus the lever 29 is pressed backward, thereby rocking the rake head or bar 27 against the action of the spring 30, and consequently forcing the rake-teeth 28 into the sand of the filter, so that as they are drawn forward they will break up and loosen any packed ore and slimes that may have been formed on the filter-surface by the action of the scrapers 16 in passing over the same. This action of the rake-teeth in and upon any packed material will obviously facilitate the access of the leaching solution to and through the filter. The presser-rail 31 for controlling the operation of the rake may be suspended from the bottom of a filter above the one in which the particular rake is to operate, or in the case of the topmost tank-filter any other suitable support may be provided for such presser-rail.

For each annular leaching-tank there will be preferably provided a number of the carriages 13 for supporting the scraping and raking mechanism described, say four of such carriages, as shown, and these may be drawn by means of chains 32, each connecting with the outer end of one of four radial arms 33, mounted to project and travel above each annular tank. These radial arms 33 are carried by a central vertically-arranged shaft 34, that is to be revolved slowly through the operation of appropriate gearing driven by any suitable engine or motor. At its inner end each radial arm 33 is hinged or pivoted, as at 35, and its outer end is provided with a wheel or roller 36 to run on the track-rail 15 at the side of the tank, thereby permitting each set of radial arms to rise and fall with the inclines of the annular tank as said arms are carried around the apparatus.

The ore or other material to be treated by leaching is fed by means of any automatic feeder onto the descending incline 4 of the uppermost annular tank at about the point 5, and the cyanid solution or other leaching liquid is admitted through pipes 6 to the separate tanks. As soon as the several tanks have been each separately supplied with leaching solution in sufficient quantity and proper strength the scraper-carriages 13 may be set in motion, and the ore is then started to feed into the topmost annular tank of the series. The scrapers 16 slowly carry the ore around this upper tank, continuously stirring it in the solution. Meanwhile the feed of the ore to the tank should be so regulated that a layer of ore about six inches thick may be maintained throughout the tank, while the solution should be in sufficient quantity to cover the ore about two inches, making a total depth of about eight inches for the solution or leaching liquid.

When the ore has been drawn around through the first annular tank and over the filter 5 therein and then upward over the ascending incline 8, it will next fall through the ore-exit 3 onto the inclined apron 9, and thence drop onto the descending incline 4 of the second annular tank at a point almost directly under where it was first fed into the upper tank. The ore is drawn around in this second tank in the same manner as in the first tank and falls into the next tank below, and so on throughout the series.

A separate pipe is provided for conducting the leaching solution into each tank, so that the solution in one tank may be of different strength from that in the others and so that the solution can be maintained at any desired strength in each tank, since the solution is not carried out of the tank with the ore except what little clings mechanically to the ore as it is carried up over the ascending incline to the ore-exit. The strongest solution is supplied to the top tank, and in each succeeding tank the solution is of less strength. This, however, may be reversed, if desired. The last or lowermost tank of the series is designed for a washing-tank, and is therefore to be supplied with water. After going through this last tank and falling beneath the same the exhausted ore may be taken to a waste-dump by means of any suitable conveyer. (Not shown.)

As the solutions in the different tanks become charged with gold and silver or extracted substances the filters are opened and the solution filters out of each tank and is to be conducted to precipitation-boxes, where it is freed from the contained value, after which the solution may be made up to a strength suitable to be used over again.

In using a cyanid solution for leaching ores a considerable length of time is required, during which the ore should be left in contact with the solution, and to meet this requirement the apparatus should be made large enough and comprise a sufficient number of tanks, so that a twenty-four to forty-eight hour treatment of the ore can be given, if desired. By the continuous feed of the ore and the means for controlling its progress through the annular tanks and from one to the other all handling of the ore is avoided after it goes into the solution, and the length of time that the ore is to remain in the solution can be easily regulated.

The scraping and raking mechanism that propels the ore through the tanks also serves to assure an intimate contact of the solution with all particles of the ore by keeping the same stirred or in a state of agitation, and by suitable adjustment of the scraper-blades the flow of ore through the tanks can be controlled without changing their speed of travel through the ore.

The inclines 4 and 8 at the beginning and end of each annular tank serve to confine the solution, so that it will not pass out at the ore-exit. While being drawn up the lengthened ascending incline 8, the ore is drained, and while still wet with the solution it is freely exposed to the oxygen of the air, thus insuring a rapid and perfect extraction of contained values, especially with the use of a cyanid solution. The provision made for a separate supply of solution to each tank permits a regulation of the strength of solution in each tank according to the requirements of the ore. As the solution is drawn off from each tank-filter it may be replaced with a fresh supply of any required strength fed in through the separate supply-pipe for that particular tank. Ordinarily the strength of cyanid solution employed will be less and less in the lower tanks than in the ones above, so that when the ore reaches the last tank containing water there is but little cyanid solution left in it, and the water takes out practically all of this remaining portion, so that the ore leaves the solution washed perfectly free from cyanid.

What I claim as my invention is—

1. An apparatus for continuous lixiviation of ores or other substances, comprising a vertical series of annular tanks located one above another and each provided with an exit through which the material that has traversed one tank is delivered to the tank beneath, the bottom of each tank being provided with an ascending incline to one side of said exit and a descending incline at the other side thereof, whereby the exit is raised above the level of the main portion of the tank-bottom to confine the leaching solution, a filter in each tank, and mechanism for drawing the ore or other material around through the solution in each annular tank, substantially as described.

2. An apparatus for continuous lixiviation of ores or other substances, comprising a vertical series of annular tanks located one above another and each provided with an exit through which the material that has traversed one of said tanks is delivered to the tank beneath, the several tank-exits being in the same vertical plane one above another and the bottom of each tank being provided with an ascending incline leading to one side of said exit and a descending incline leading from its other side, an inclined apron located beneath each of said exits to deflect material falling through the same onto the descending incline of the tank below, a filter in each tank, and mechanism for gradually moving the ore around through each annular tank, substantially as described.

3. An apparatus for continuous lixiviation of ores or other substances, comprising a vertical series of annular tanks located one above another and each provided with an exit through which the material that has traversed one of said tanks is delivered to the tank beneath, the bottom of each tank being provided with an ascending incline leading to one side of said exit and a descending incline at the other side thereof, whereby the exit is raised above the level of the main portion of the tank-bottom to confine the leaching solution, a filter located at the foot of the ascending incline in each tank and sunk below the level of the tank-bottom, and mechanism for moving the ore around through the solution in each tank, substantially as described.

4. An apparatus for continuous lixiviation of ores or other substances, comprising a vertical series of annular tanks located one above another and each provided with an exit through which the material that has traversed one of said tanks is delivered to the tank beneath, the bottom of each tank being provided with an ascending incline leading to one side of said exit and a descending incline at the other side thereof, a filter sunk in the bottom of the main portion of each tank at the foot of said ascending incline and provided with a layer of sand or filtering material level with the bottom of the main portion of the tank, and mechanism for moving the ore around through the solution in each tank, substantially as described.

5. In a lixiviation apparatus, the combination with an annular tank provided with an ore-exit, and a filter located in said tank, of a scraper-carriage mounted on wheels arranged to travel on track-rails at the sides of the tank, a series of scrapers supported by said carriage and each provided with a vertical arm having a crank on its upper end, a slide-bar engaged with said cranks, a screw for adjusting said slide-bar to vary the inclination of the scrapers, and mechanism for moving said carriage around the tank, substantially as described.

6. In a lixiviation apparatus, the combination with an annular tank provided with an ore-exit, and a filter located in said tank, of a scraper-carriage mounted on wheels arranged to travel on track-rails at the sides of the tank, a series of adjustable scrapers supported by said carriage, a rocking rake mounted on the scraper-carriage and provided with a lever, a spring to normally hold the rake-teeth away from the tank-bottom, a presser-rail to act on the rake-lever for forcing the rake-teeth down into the sand of the filter to loosen and break up any packed ore on the filter-surface, and mechanism for moving said carriage around the tank, substantially as described.

7. In a lixiviation apparatus, the combination of a vertical series of annular tanks arranged one above another and each provided with an exit through which ore or other substances may be discharged into the tank beneath, filters located in the several annular tanks, a number of wheeled carriages arranged to be moved in succession around each tank, scraper and rake mechanism mounted in each carriage to stir the ore contained in each tank and cause it to be moved along through the solution therein, and a central vertical shaft having radial arms connected with the several carriages and adapted to be slowly revolved to draw said carriages gradually along the annular tanks, substantially as described.

8. In a lixiviation apparatus, the combination of a vertical series of annular tanks arranged one above another and each provided with an exit through which ore or other substances may be discharged into the tank beneath, each tank-bottom being provided with an ascending incline leading to one side of the tank-exit and having a descending incline on the other side, means for feeding ore into the topmost tank, pipes for conveying leaching solution into the several tanks separately, the feed of the ore to be continuous and the feed of the solution to be continuous or intermittent, filters located in the several annular tanks, and automatic scraping and stirring mechanism to cause the ore and solution to be moved around each annular tank and over the filter therein, substantially as described.

9. In a lixiviation apparatus, the combination with an annular tank, and a filter therein, of a traveling carriage adapted to be moved around said tank, a series of scrapers depending into the tank from said carriage, and means for adjusting the scraper-blades to any required angle to vary the speed with which the ore is moved around in the annular tank, substantially as described.

10. In a lixiviation apparatus, the combination of a series of annular tanks located one above another and each provided with an exit through which ore may be discharged into the tank beneath, each tank-bottom being provided on one side of the tank-exit with a descending incline and on the other side a lengthened ascending incline, a filter in each tank-bottom, and automatic mechanism for drawing the ore around the annular tanks and up the ascending inclines thereof to the tank-exits, whereby on said ascending inclines the ore is drained of the leaching solution and exposed while still wet with said solution to the oxygen of the air before falling through the ore-exit into the tank below, substantially as described.

11. In a lixiviation apparatus, the combination with a series of annular tanks arranged one above another and each provided with an ore-exit through which the ore is discharged to a tank beneath, of a filter located in the bottom of each annular tank and provided with a frame carrying a filter-cloth and a layer of sand supported thereon to about the level of the tank-bottom, means for supplying leaching solution to the separate tanks, and automatic mechanism for moving ore around through the several annular tanks and over the filters therein, substantially as described.

12. In a lixiviation apparatus, the combination of a series of annular tanks arranged one above another and each provided with an exit for discharge of ore into the tank beneath, the ore to be fed into the topmost tank, pipes for separately supplying said tanks with leaching solution, a filter sunk into the bottom of each tank and having a sand layer level with the main portion of the tank-bottom, and automatic scraper and rake mechanism adapted to be moved around in each annular tank to agitate the ore and move it along the tank and to prevent packing of the ore on the filter-surface, substantially as described.

In testimony whereof I have hereunto set my hand in presence of two subscribing witnesses.

HERBERT B. WILLIAMS.

Witnesses:
H. J. SCHULTZ,
THOS. W. LEWIS.